United States Patent [19]

Cairns et al.

[11] 4,297,246
[45] Oct. 27, 1981

[54] METHOD OF PRODUCING DENSE REFRACTORY OXIDE COATINGS ON METALLIC SUBSTRATES AND THE PRODUCTION OF CATALYSTS FROM THE COATED SUBSTRATES

[75] Inventors: James A. Cairns, Wantage; Robert L. Nelson, Kingston Bagpuize; James L. Woodhead, Didcot, all of England

[73] Assignee: United Kingdom Atomic Energy Authority, England

[21] Appl. No.: 954,532

[22] Filed: Oct. 25, 1978

[30] Foreign Application Priority Data

Nov. 1, 1977 [GB] United Kingdom ............... 45471/77

[51] Int. Cl.$^3$ ........................ B01J 21/08; B01J 23/10; B01J 23/56; B32B 15/18
[52] U.S. Cl. .................................... 252/465; 148/28; 148/31.5; 148/38; 376/457; 376/900; 208/48 R; 252/317; 252/466 B; 252/466 PT; 423/213.2; 423/213.5; 427/372 A; 427/380; 427/419 A; 427/419 B; 428/469; 427/397.7; 427/419.2; 427/419.3
[58] Field of Search ..................... 428/474; 423/213.2, 423/213.5, 263, 397; 252/317, 466 B, 465, 466 PT, 477 R; 427/383 B, 383 C, 372 A, 380, 419 A, 419 B; 148/28, 31.5, 38

[56] References Cited

U.S. PATENT DOCUMENTS

| 3,133,829 | 5/1964 | Cupery et al. | |
| 3,518,050 | 6/1970 | Woodhead | 423/397 |
| 3,761,571 | 9/1973 | Woodhead | 252/317 X |
| 3,785,998 | 1/1974 | Hoekstra | 423/213.5 X |
| 3,893,950 | 7/1975 | Mai et al. | 423/213.5 |
| 3,894,963 | 7/1975 | Gerdes et al. | 252/466 B X |
| 3,920,583 | 11/1975 | Pugh | 423/213.2 X |
| 3,957,692 | 5/1976 | Cairns et al. | 423/213.2 X |
| 3,966,645 | 6/1976 | Cairns et al. | 423/213.5 X |
| 4,070,286 | 1/1978 | Iler et al. | 252/317 X |
| 4,096,095 | 6/1978 | Cairns | 423/213.5 |

Primary Examiner—James C. Cannon
Attorney, Agent, or Firm—Larson, Taylor and Hinds

[57] ABSTRACT

The invention is concerned with providing substrates with coatings obtainable from sols, for example to protect the substrate (such as in nuclear reactors or hydrocarbon cracking plant) or to provide a carrier for catalytically active material.

Hitherto, coatings obtained from sols have had a high porosity and high surface area so that they have not been entirely satisfactory for the above applications.

In the invention, dense, low-porosity coatings are provided by contacting the substrate with a sol of refractory material (e.g. $CeO_2$ or $SiO_2$) convertible to a gel of density at least 40% of the theoretical density of the refractory material, and converting the sol to the gel. Optionally, the gel may be converted to a ceramic coating by firing.

10 Claims, No Drawings

METHOD OF PRODUCING DENSE REFRACTORY OXIDE COATINGS ON METALLIC SUBSTRATES AND THE PRODUCTION OF CATALYSTS FROM THE COATED SUBSTRATES

TECHNICAL FIELD

This invention relates to the provision of coatings on substrates, which coatings may be useful, for example, as protective coatings for the substrate or for carrying catalytically active material.

BACKGROUND ART

It is known to provide a coating of a refractory oxide on a substrate by contacting the substrate with a sol of the refractory oxide followed by drying to convert the sol to a gel to give a gel-coated substrate, and optionally firing. For example, the specification of our U.K. Pat. No. 1,490,977 (corresponding to U.S. Pat. No. 3,957,692) describes, inter alia, contacting an aluminium bearing ferritic alloy substrate, either oxidized or unoxidized, with a boehmite sol, followed by drying to convert the sol to the corresponding gel and firing. Also, the specification of our West German OLS No. 2,647,702 (corresponding to U.S. patent application Ser. No. 733,152 of Oct. 18, 1976, now abandoned) describes, inter alia, carrying out a similar process but using an alumina sol which has been made by dispersing in water an alumina prepared by flame hydrolysis. In each of the above instances, the alumina coatings, both in the gel and in the fired form, are particularly suitable as carriers of catalytically active material, such as a platinum group metal, in catalysts. The sols used in each of these instances comprise aggregated colloidal primary particles.

DISCLOSURE OF INVENTION

We have now found that gel coatings may be produced from sols, which coatings have a lower porosity and higher density than the aforementioned coatings, and that such gel coatings are convertible to ceramic coatings of low porosity and high density even after relatively mild heat treatment. This may be done by using sols comprising unaggregated colloidal primary particles, or aggregated colloidal primary particles with additional components to occupy the gaps in the aggregated particles.

Thus, the present invention provides, in one aspect, a method of providing a substrate with a gel coating, characterised in that the substrate is contacted with a sol of a refractory material and capable of being converted to a gel of the refractory material, the bulk density of the gel being at least 40%, preferably at least 45%, of the theoretical density of the refractory material, and the sol is converted to a gel to provide the substrate with the gel coating.

The invention also provides a substrate carrying an adherent coating of a gel of a refractory material, wherein the density of the gel is at least 40% of the theoretical density of the refractory material.

The refractory material in the sol and the gel of our invention is present in the form of a precursor of the refractory material itself, such as a hydrated form of the material in the case of an aquasol or gel produced therefrom. Such a precursor always gives the material itself on firing.

Preferably, the gel-coated substrate of our invention is fired to give a substrate with a ceramic coating of the refractory material itself, which ceramic may have a bulk density which is at least 60% of the theoretical density of the refractory material. It should be noted that, whilst it may be possible to produce such dense ceramic coatings by prolonged heat treatment of known gel coatings, our dense ceramic coatings may be produced by heat treatment under much milder conditions.

It should be noted that, in some cases, there may be chemical interaction at the interface between the gel and the substrate thereby giving rise to an interposed layer.

By 'bulk density' in this specification is meant the average density of the material inclusive of the matrix and open and closed pores. By 'theoretical density' is meant the density of the refractory material as such, i.e., the density of the material in the absence of any cavities, pores or the like.

It should be noted that the density of a gel which has been dried at an elevated temperature may, in some cases, be somewhat less than that of a gel which has been dried at ambient temperature due to loss of water on drying. The bulk density values in our invention are to be taken to relate to a gel when dried at ambient temperature, whether actually or notionally.

It should be further noted that determination of densities of very thin layers such as the coatings of our invention may be difficult. The density values given in the examples of this specification have been carried out on bulk materials, i.e. on gels and ceramics in the absence of a substrate, since determination of densities of such material is relatively simple experimentally. We have not carried out density determination of the material in a coating as such. We cannot therefore be entirely certain that densities of the coatings will be the same as those of bulk materials derived from the same sols though we see no reason why they should not be substantially similar and, if anything, we would expect the coatings to have higher densities.

In applications of our invention, thin coatings (i.e. of the order of microns) are generally adequate, which distinguishes our coatings from coatings obtained from paints, glazes, enamels and plasma sprayed coatings. The coated substrates of our invention have a number of valuable applications dependent upon the substrate and refractory material chosen. Thus, the coatings may be used, for example, to confer oxidation resistance to the substrate, as a pre-coat on the substrate for carrying subsequently applied catalytically active material, and to inhibit carbon deposition in certain environments. A more detailed discussion of such applications will be provided hereinafter.

The general role of the coating is to confer a high degree of protection to the substrate by virtue of its high density and low porosity. The coating therefore isolates the substrate from its environment thereby protecting it from attack by gaseous species in the environment. Also, when the coating carries an additional layer such as of catalytically active material, the latter is protected from attack by the substrate such as when the substrate contains mobile metal ions. Furthermore, the coating may be catalytically active in its own right.

It should be noted that the sols used in the present invention need not necessarily comprise colloidal particles of one refractory material only. Thus, they may be 'mixed' sols comprising colloidal particles of more than one refractory material. Also, the sols may contain additional components dispersed in the liquid medium of the sol, for example, in solution in the liquid medium.

A preferred way of carrying out the method of the invention is to use, as the sol, a dispersion of substantially unaggregated colloidal primary particles of the refractory material in a liquid medium. Because of the lack of aggregation, such sols are readily convertible, on drying, to dense, low porosity gels as required in the present invention, i.e., the primary particles can readily 'pack down' to a dense, low porosity structure upon drying and firing. Such sols are known in the art and examples include certain sols of refractory oxides such as $CeO_2$ sol described at page 3 line 49 of our U.K. patent specification No. 1,342,893 and at column 3 line 63 of our corresponding U.S. Pat. No. 3,761,571. Also, the conditioned slurry specifically mentioned in Example 3 of each of these specifications may be diluted with water to give such a sol, and the gel specifically described in the same example may be redispersed in water to give such a sol. Also, the gel specifically described in Example 5 of each of the above specifications may be redispersed in water to give such a sol. Other examples of sols which may be used in the present invention are a $ZrO_2$ sol as described in our U.K. patent specification No. 1,181,794 (corresponding to our U.S. Pat. No. 3,518,050), a $TiO_2$ sol as described in our U.K. patent specification No. 1,412,937, a $SiO_2$ sol believed to be made by hydrolysing sodium silicate and sold commercially by Monsanto under the trade name of 'Syton', and $ThO_2$ sol made for example by thermally denitrating hydrated thorium nitrate at not more than 490° C. and dispersing the product in water. The particle sizes of the colloidal particles in the sols are typically in the range of 20 Å to 500 Å, for example 50 Å to 200 Å. It should be noted however, that the above exemplified sols are not necessarily of equal utility in the applications of the present invention, i.e., some sols may be better than others for specific applications.

The preferred sols above may, if desired, contain components additional to the unaggregated primary colloidal particles. For example, they may contain colloidal particles comprising loose aggregate structures of primary-particles, wherein the colloidal particles have been made by dispersing primary-particles, made by a vapour phase condensation method such as flame hydrolysis, in water and as described in the specification of aforementioned West German OLS No. 2,647,702. Such additional components, for example $Al_2O_3$, may be used to provide the coatings in our invention with other desired properties such as improving their ability to cause further layers to adhere thereto.

Alternatively, the sols used in the method of our invention may comprise colloidal particles which are aggregated, but where the sols contain additional components dispersed therein which substantially fill the gaps in the aggregated particles so that the sols give rise to a dense gel coating according to the invention when converted to a gel. Such additional components may, for example, comprise salts in solution in the liquid medium of the sol and of sufficient concentration for the ions of the salt to substantially fill the gaps in the aggregated colloidal particles. A preferred example of such a sol is a sol comprising components which when dried to give a gel and subsequently fired are convertible to a glass-based coating. Such sol may comprise, for example, a $SiO_2$ sol containing aggregated colloidal particles and which contain additional components, in solution, which are capable of reacting together and with the $SiO_2$ on firing to give a glass-based material. Such components may include, for example, a soluble borates, and soluble Li and Na salts in solution in the sol. The $SiO_2$ sol may, for example, be a sol made by dispersing in water $SiO_2$ which has been made by a vapour phase condensation method such as flame hydrolysis and to which reference has already been made herein. It should also be mentioned, however, that coatings comprising glass-based materials may be provided according to our invention using sols comprising substantially unaggregated colloidal primary particles, such as the abovementioned 'Syton' $SiO_2$ sol. Glass-based materials include, for example, conventional glasses and also glass-ceramics.

The method of our invention may be carried out very simply, for example by immersing the substrate in the sol, removing and drying to convert the sol to the corresponding gel, optionally followed by firing if a non-gel ceramic coating is desired. Thus, a substrate of complex shape may readily be treated to provide a coating. Also, a coating of controlled thickness may be produced, typically, 1 μm or less, so that significant dimensional changes are avoided, even if more than one coating is provided.

The substrate in the invention may be either metallic or non-metallic, though we prefer the former since protective coatings are more often required for metallic substrates. Thus, metallic substrates, such as steels, may be protected from oxidative attack by the present invention. An example of a metallic substrate which may be used is an aluminium bearing ferritic alloy such as an alloy of Fe, Cr, Al and Y, a specific example of which is an alloy having proportions by weight of up to 20% Cr, 0.5% to 12% Al, 0.1% to 3% Y, and the balance Fe. Such alloys are known to be very useful substrates in catalysts for the treatment of the noxious constituents of motor vehicle exhause gases (see, for example, the specification of our U.K. Pat. No. 3,920,583). However, such alloys owe their oxidation resistance in the exhaust gas treatment application to the presence of an $Al_2O_3$ barrier layer, preformed on the alloy by oxidising at elevated temperatures, for example, by heating at about 1000° C. in air, typically for 8 hours. This preforming step may, however, constitute an expensive step in the production of a catalyst. We have found that it may be dispensed with by using the present method, for example by using the abovementioned $CeO_2$ sol and a firing temperature in the range of 500° C. to 800° C. for a much shorter time, typically 15 minutes, which gives a highly satisfactory barrier layer for inhibiting diffusion of metallic ions from the substrate to the surface, and for preventing diffusion of gases and liquids towards the substrate. A catalyst may then be prepared by applying a catalytically active material, such as a platinum group metal, to the coating, for example, in combination with a high surface area refractory oxide such as $Al_2O_3$ as described in the specification of our aforementioned West German OLS No. 2,647,702. The $CeO_2$ coating in such a case acts as a temporary protective barrier until such time as alumina is generated from the alloy during use of the catalyst.

The present invention also has application in situations where it is desirable to alter the surface chemistry of a metal and thereby eliminate certain undesirable chemical effects. One such effect is the deposition of carbonaceous layers on steel surfaces which are exposed to hydrocarbon-containing environments. This can occur, for example, in chemical plant such as plant for the thermal cracking of hydrocarbons where the formation of carbonaceous deposits on heated steel cracker tubes gives rise to an undesirable insulation effect. Also, carbonaceous deposits can occur in nuclear reactors, such as the Advanced Gas Cooled Reactor (known in the art and referred to hereinafter as the 'AGR') where stainless steel fuel cans are exposed to a hydrocarbon-containing coolant gas. Here, carbonaceous deposits deleteriously affect the heat exchange balance between the fuel cans and the coolant thereby causing overheating. We have found that the present invention, when applied to the fuel cans, can bring about substantial reductions in carbonaceous deposition under the above circumstances. It should be noted, however, that, for this 'AGR' application, we have indications that it may be desirable to provide the steel with a first oxide coating by, for example, providing a preliminary oxidising treatment (e.g. heating in air at 800° C. for 15 minutes) before providing the coating according to the present invention. Examples of steels which may be used in the 'AGR' as the fuel can material and which are suitable for coating according to our invention are Cr bearing austenitic steels, for example, stabilised by Nb, a particular example of which is the so-called "20/25" steel which contains 20% Cr, 25% Ni, about 0.1% Nb and the balance iron, wherein the proportions are by weight. The role of the coating in the inhibition of carbonaceous deposition may be twofold. Firstly, it may act to isolate the substrate from the environment, thereby preventing certain constituents in the substrate from catalysing chemical reactions giving rise to carbonaceous deposition. Secondly, the coatings may themselves act catalytically in processes which prevent carbonaceous deposition. The aforementioned $CeO_2$ sol is particularly advantageous in this respect.

The coatings of our invention may be provided with additional constituents in order to achieve particular aims or properties. The aforementioned provision of glasses on substrates is an example of this. Also, for example, coatings which controlled electrical properties may be provided on electrically conductive or non-electrically conductive substrates.

BEST MODE FOR CARRYING OUT THE INVENTION

A number of ways of carrying out the invention are described in detail in the examples below.

Example 1

Preparation of $CeO_2$ sol 3.5 kg of cerium IV hydroxide (99.5% purity) ex Rhône-Poulenc (2.48 kg oxide, 0.210 kg $NO_3^-$) were mixed with 7 l of demineralised water and 0.58 l of 8 M nitric acid (total slurry volume of 9.6 l) and the stirred slurry heated to 80° over a period of 2 h and maintained at 80°–85° for 1 h. The pH reached at equilibrium was <1. The slurry ($HNO_3/CeO_2$: 0.32) was allowed to cool overnight (16 h). The supernate was syphoned off (6.76 l) and analysed for acidify (0.28 M), nitrate (0.5 M) and oxide content (8.0 g/l). A sufficient volume of water (2.5 l) was added to the settled conditioned slurry residue in order to give a non-chalking colloidal dispersion (sol) and the new total volume measured (5.35 l). The sol was then analysed for density (1.42 g/cc), oxide content (462 g/l) nitrate (0.8 M: $NO_3/CeO_2$=0.29).

0.2 ml of a 20% polyvinyl alcohol solution were added per 100 ml of a $CeO_2$ aquasol prepared as above and adjusted to a concentration of 100 g of $CeO_2$ per l, and also a few drops of a 1% solution of BDH Nonidet (Registered Trade Mark) P40 wetting agent.

Oxidation Protection of Steel

A specimen of an austentitic stainless steel containing 18% Cr by weight, 8% Ni by weight, and a small amount of Ti (the 'so called' 18/8/Ti steel) was immersed in the $CeO_2$ aquasol prepared as above. The specimen was removed and dried to convert the $CeO_2$ sol coating to a $CeO_2$ gel coating. The specimen was next fired at 850° C. for 5 minutes to give a $CeO_2$ coated steel product.

When the above product was heated for 12 hours in air at 850° C., it remained ductile and exhibited a smooth, continuous surface. Its characteristic X-ray spectrum, generated by 20 KV electron bombardment, was dominated by Cr. Also, when the product was further heated for 12 hours in air at 1000° C., it showed no severe deterioration.

By way of comparison, an untreated specimen of 18/8/Ti stainless steel was heated for 12 hours in air at 850° C. The specimen became brittle and was observed to be covered with a discontinuous, poorly adherent oxide layer. Its characteristic X-ray spectrum, generated as above, was dominated by iron (oxide).

Example 2

Prevention of Carbonaceous Deposition under AGR Conditions

Specimens of 20/25/Nb stainless steel were provided with $CeO_2$ coatings as described in Example 1. The coated specimens were stacked on a steel rod and placed in a test rig in a materials testing reactor (known as 'DIDO') and exposed at a temperature of 650° C. for 1200 hours at a dose rate of 1 W.g$^{-1}$ to recirculate $CO_2$ gas containing 2% CO, 350 vpm $CH_4$ flowing at 40 liters/hour at a pressure of 600 psig. At the completion of the exposure period, the $CeO_2$ coated specimens were observed to be substantially free from carbonaceous deposits. In contrast, uncoated specimens of 20/25/Nb steel which had been subjected to identical conditions were observed to be covered with a dark carbonaceous layer.

Example 3

Catalyst Preparation

A specimen of Fecralloy (Registered Trade Mark) aluminium bearing ferritic alloy of composition of weight of up to 20% Cr, 0.5% to 12% Al, from 0.1% to 3% Y and the balance Fe, was immersed in a $CeO_2$ sol as used in Example 1, removed and dried to convert the sol to a gel, and fired for a few minutes at 500° to 600° C. to give a $CeO_2$ coated product, wherein the alloy was observed to have retained its silvery appearance after the firing. (In contrast, an untreated sample of the alloy acquired a golden colour, due to oxidation, after similar firing).

Finely powdered $Al_2O_3$, having a small particle size (~10 nm) and high surface area (~100 m$^2$/g) was dispersed in water to give a sol containing 160 g $Al_2O_3$/l. A solution of yttrium nitrate of composition 170 g $Y_2O_3$ equivalent/l was made up and the sol and the solution mixed in proportions to give a "mixed sol" having 91.5 g $Al_2O_3$/l and 0.45 g $Y_2O_3$/l. Polyvinyl alcohol (PVA) and $H_2PtCl_6$ were dissolved in the mixed sol to give 0.61 g PVA/l and 15.5 g $H_2PtCl_6$/l (≡6.06 g Pt) in a final sol, to which a few drops of Nonidet P40 wetting agent were added.

The $CeO_2$ coated alloy was immersed in the above final sol, removed, dried and fired in air at 850° C. for 15 minutes to produce a catalyst where the $CeO_2$ coated alloy had a catalytically active coating of Pt carried by $Al_2O_3$. Standard tests were carried out on the catalyst for treatment of motor vehicle exhaust gases and gave almost identical results to those obtained with a catalyst prepared as above but wherein the alloy had been oxidised at 1000° C. for 12 hours instead of being provided with a $CeO_2$ coating.

Example 4

Catalyst Preparation

An alumina sol with a concentration of 289 g $Al_2O_3/l$ was prepared as described in Example 3 and yttrium nitrate solution was added to give relative proportions by weight of 99.8% $Al_2O_3$ and 0.2% $Y_2O_3$. 0.2 ml of a 20% PVA solution per 100 ml of the sol and a few drops of Nonidet P40 wetting agent were also added. A 10 ml aliquot of the resulting sol was then mixed with 100 ml of a $CeO_2$ sol, prepared as in Example 1 and containing 260 g $CeO_2/l$, to give a mixed sol wherein the relative proportions by weight were: $CeO_2$ 89.78%; $Al_2O_3$ 10.03%; $Y_2O_3$ 0.19%.

A specimen of 'Fecralloy' alloy, as used in Example 3 was immersed in the mixed sol, removed, dried and fired for a few minutes at 500° to 600° C. In the coated product, the alloy had retained its silvery appearance, and the presence of the $Al_2O_3$, which was porous, was found to assist in the 'keying' of subsequently applied coatings.

Example 5

Preparation of Glass Coatings on a Substrate from Sols

Sodium borate (100 g) was added to water (500 ml) and heated to 60° C. to assist dissolution; the pH of the solution was 9.5 and 16 M nitric acid (35 ml) was gradually added to give a solution with pH 1.5. Lithium nitrate trihydrate (110 g) was added followed by sodium nitrate (30 g); no change in pH occurred and the solution (1.14 l) was stable to precipitation at 45° C. The solution was separated into two 570 ml aliquots which were then treated as follows:

(a) flame hydrolysed silica powder (93 g) was gradually added to a first aliquot with stirring; to maintain the sol in a fluid state it was necessary to add further water (100 ml). 0.2 of a 20% PVA solution per 100 ml of the sol and a few drops of Nonidet P40 wetting agent were also added. The sol contained 183 g/l total oxides and was stable to coagulation for several weeks;

(b) to the second aliquot of the nitrate solution, a proprietory silica sol (SYTON-X30) (250 ml) containing 340 g/l $SiO_2$ was added to give a total oxide concentration of 159 g/l. 0.2 ml of a 20% PVA solution per 100 ml of the sol and a few drops of Nonidet P40 wetting agent were also added. After mixing for 5 minutes the fluid sol was aged to 24° C. and found to be thixotropic, e.g., within a few hours the sol assumed a jelly-like condition but when gently agitated it regained its former fluidity.

Each of the sols produced in (a) and (b) above was tested as follows. A specimen of 'Fecralloy' alloy, as used in Example 3, was partly immersed in the sol, removed, dried and fired for a few minutes at 600° C. In each case, the portion of the alloy which had been immersed retained its silvery appearance, whilst the portion which had not been immersed had acquired a golden colour, due to oxidation.

Example 6

Bulk Densities of Gel and Fired Products Obtained from Sols

Samples of refractory oxide sols, usable in the present invention, were dried to the corresponding gel form and the bulk density of each resulting gel measured by known Hg immersion techniques. The gels were then fired to give the non-gel ceramic form of the oxide and the densities measured in all cases. The results are summarised in the table below where the densities are given as a percentage of the theoretical density of the refractory oxide.

| Sol | | Bulk Densities (as % of the theoretical density of the anhydrous oxide) | |
|---|---|---|---|
| | | Gel (after drying at ambient temperature) | Fired Gel (firing temperature in parentheses) |
| $CeO_2$ | (prepared as in Ex. 3 of UK Patent Specification No. 1 342 893) | 56% | 75% (800° C.) |
| $SiO_2$ | ('Syton' sol) | 77.2% | 67% (500° C.) |
| $ZrO_2$ | | 51.0% | 94% (870° C.) |
| $TiO_2$ | | 54% | 96% (800° C.) |
| $SiO_2$ | (+ $LiNO_3$ + $Na_2B_4O_7$ $NaNO_3$) (as prepared in Example 5 (a)) | 50.3% | 87% (700° C.) |

If the densities of the gels are considered as percentages of the theoretical densities of the appropriate hydrous oxides rather than of the final anhydrous oxides as used above, the values are considerably higher, e.g., the $ZrO_2$ gel density is 87.9% of the theoretical density of zirconium hydroxide.

Also, as mentioned herein, the density of a gel which has been dried at an elevated temperature may, in some cases, be somewhat less than that of a gel which has been dried at ambient temperature. For example, the above $ZrO_2$ gel, if dried at an elevated temperature, was found to have a % bulk density of 48.8% of the theoretical density of the anhydrous oxide.

Example 7

Coating of Mild Steel

A sample of mild steel was immersed in a $CeO_2$ sol prepared as in Example 1 and containing additionally a water soluble silicone. The concentrations were: $CeO_2$ 37.5 g/l; silicone 3.5 g/l. The sample was then removed and dried to convert the sol to a gel. The silicone was provided because $CeO_2$ sol itself may be sufficiently acidic to attack mild steel.

The gel coated sample was then fired at 200° C. for 10 minutes. This gave a ceramic coating which was found to improve the resistance of the mild steel to atmospheric corrosion and which was capable of acting as a primer for a subsequently applied paint layer.

It should be noted that the above firing temperature is substantially lower than those of our preceding examples. This is because mild steel is liable to oxidise at high firing temperatures before the applied coatings have densified and can provide protection.

Example 8

Coating of Mild Steel

The procedure of Example 7 was repeated but using, instead of the silicone containing $CeO_2$ sol, proprietory silica sol (SYTON-X30) of concentration 20 g/l. The results were substantially similar to those of Example 7.

We claim:

1. A method of coating a substrate with a refractory oxide selected from the group consisting of ceria, zirconia and titania which comprises the steps of
   (i) contacting the substrate with a sol of said refractory oxide comprising a dispersion, in a liquid medium, of substantially unaggregated colloidal primary particles of the refractory oxide or of aggregated colloidal primary particles of the refractory oxide and ions which occupy gaps in said aggregated particles, said sol being capable of being converted to a gel of the refractory oxide, the bulk density of the gel being at least 40% of the theoretical density of the refractory material;
   (ii) converting the sol to a gel to provide the substrate with a gel coating; and
   (iii) firing to convert the gel coating to said refractory oxide coating.

2. A method according to claim 1 wherein the bulk density of the gel is at least 45% of the theoretical density of the refractory oxide.

3. A method according to claim 1 wherein catalytically active material is applied to the coated substrate.

4. A method according to claim 3 wherein the substrate is an aluminium bearing ferritic alloy.

5. A method according to claim 4 wherein the alloy has proportions by weight of up to 20% Cr, 0.5 to 12% Al, 0.1 to 3% Y, and the balance Fe.

6. A method of coating a substrate with a refractory oxide which comprises the steps of
   (i) contacting the substrate with a sol comprising an aqueous dispersion of substantially unaggregated colloidal primary particles of ceria or of aggregated colloidal primary particles of ceria and ions which occupy gaps in said aggregated particles, said sol being capable of being converted to a gel of the refractory oxide, the bulk density of the gel being at least 40% of the theoretical density of the refractory material;
   (ii) converting the sol to a gel to provide the substrate with a gel coating; and
   (iii) firing to convert the gel coating to a refractory oxide coating.

7. A method of coating a substrate with a other than silica which comprises the steps of
   (i) contacting the substrate with a sol of said refractory oxide comprising a dispersion, in a liquid medium, of substantially unaggregated colloidal primary particles of the refractory oxide or of aggregated colloidal primary particles of the refractory oxide and ions which occupy gaps in said aggregated particles, said sol being capable of being converted to a glass-based material by carrying out steps (ii) and (iii) below:
   (ii) converting the sol to a gel to provide the substrate with a gel coating, the bulk density of the gel being at least 40% of the theoretical density of the refractory material; and
   (iii) firing to convert the gel coating to a glass-based refractory oxide coating.

8. The method of claim 7 wherein the sol is a sol of a refractory metal oxide selected from the group consisting of ceria, zirconia and titania.

9. A method of coating a substrate with a other than silicawhich comprises the steps of
   (i) contacting a Nb stabilized Cr bearing austentic steel with a sol of said refractory oxide comprising a dispersion, in a liquid medium, of substantially unaggregated colloidal primary particles of the refractory oxide or of aggregated colloidal primary particles of the refractory oxide and ions which occupy gaps in said aggregated particles, said sol being capable of being converted to a gel of the refractory oxide, the bulk density of the gel being at least 40% of the theoretical density of the refractory material;
   (ii) converting the sol to a gel to provide said austentic steel with a gel coating; and
   (iii) firing to convert the gel coating to a refractory oxide coating.

10. The method of claim 9 wherein the sol is a sol of a refractory metal oxide selected from the group consisting of ceria, zirconia and titania.

* * * * *